Sept. 11, 1962 W. O. VEDDER ET AL 3,053,031
SONIC CLEANING OF DUST FILTERS
Filed Oct. 19, 1959
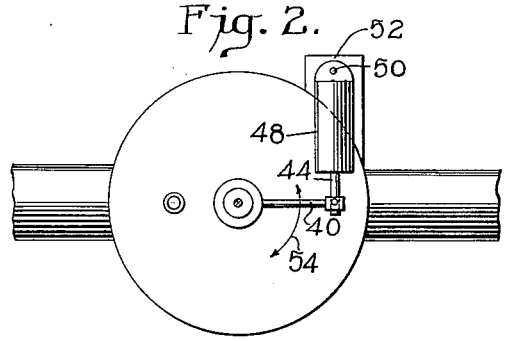
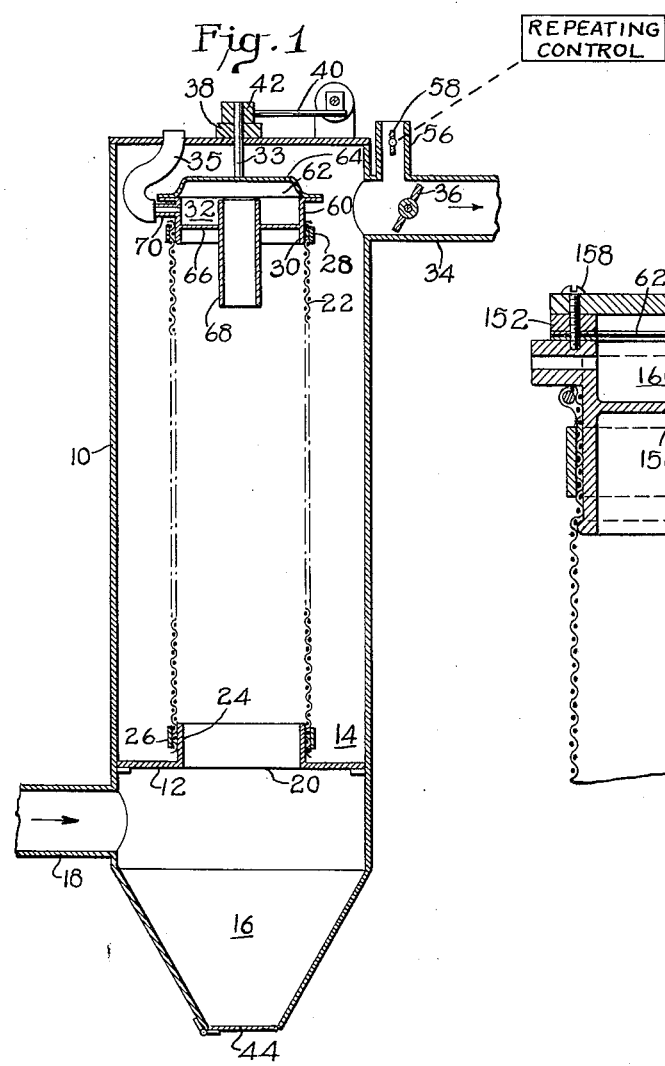
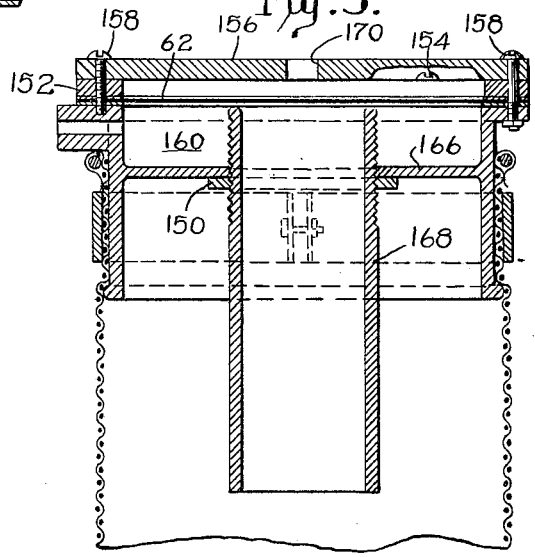
INVENTORS
WALTER O. VEDDER
WILLIAM F. GIBBY
BY *Connolly and Hutz*
ATTORNEYS United States Patent Office 3,053,031
Patented Sept. 11, 1962

3,053,031
SONIC CLEANING OF DUST FILTERS
Walter O. Vedder and William F. Gibby, Hagerstown, Md., assignors to Pangborn Corporation, Hagerstown, Md., a corporation of Maryland
Filed Oct. 19, 1959, Ser. No. 847,240
10 Claims. (Cl. 55—292)

The present invention relates to fabric type dust filters that are self-cleaning and, when combined in groups of two or more separate units, can be used substantially continuously.

While self-cleaning fabric type dust filters have been extensively used in the prior art, such use has been complicated and limited by the fact that the self-cleaning operations cause excessive wear of the filter elements or associated portions of the apparatus, or practical constructions are quite complicated and expensive. This is particularly true where the dust filters are of the high temperature types.

Use of sound waves in the self-cleaning operations has been suggested as a way out of some of the above difficulties inasmuch as the application of the sound waves does not wear the filter element or associated portions of the apparatus, and practical constructions for the application of the sound waves at high temperature can be devised. However, heretofore suggested sound-type self-cleaning methods and apparatus have not been sufficiently satisfactory to be acceptable by commercial standards. In particular, sound intensity requirements have been so great as to make the cost of the sound generating apparatus excessive.

Among the objects of the present invention is the provision of sound operated self-cleaning dust filters which avoid the above disadvantages.

This as well as other objects of the present invention will be more clearly understood from the following description of several of its exemplifications, references being made to the drawings wherein:

FIG. 1 is a vertical sectional view of one form of self-cleaning dust filter according to the present invention;

FIG. 2 is a plan view of the self-cleaning dust filter of FIG. 1; and

FIG. 3 is an enlarged detail view similar to FIG. 1, showing a modified form of self-cleaning filter representative of this invention.

It has been discovered that highly effective self-cleaning action is obtained with the above type of sound energized dust filters in which there is a housing for the dust-laden gases to be passed through, a generally vertically directed filter tube supported within the housing and connected to receive the dust-laden gas at its lower end, the tube having a filter wall construction to cause the received gas to leave through the wall while the dust carried by the gas is trapped by the wall and thereby retained within the tube, the filter wall of the tube being about 4 to 25 feet long, the upper end of the tube being directly secured around a sound-generating horn connected for intermittent energization to emit sound with an intensity that loosens the dust particles trapped on the inside of the filter wall and permits the loosened particles to drop through the tube and out its lower end.

It is also desirable, particularly with the longer lengths of filter tubes, to provide a supplemental arrangement for flexing the filter tubes. To this end a mechanical actuator can be connected to the horn support or to a cap for the tube, to impart a twisting motion to the filter tube and thereby help remove the accumulated dust cake on the surface of the filter tube. A desirable form of arrangement includes flow reversing mechanism to reverse the flow of gas through the filter wall while the horn is energized, flexing the tube walls and also improving the removal of the accumulated dust cake from the surface of the filter tube. A filter cake which contains a large number of small fracture cracks caused by flexing or twisting of the tube is more easily separated from the filter fabric than an unfractured cake.

In FIG. 1 of the drawings there is shown a typical construction of the present invention having a housing 10 of vertically extended form divided by a horizontal partition 12 into a clean air compartment 14 above the partition and a dusty air compartment 16 below the partition. A conduit 18 opens into the dusty air compartment 16 to supply the dust-laden gas stream which is to be filtered.

The partition 12 contains an opening 20 that leads to an elongated filter tube 22 which can be of textile construction made of cotton, synthetic resinous fibers, glass fibers or metal fibers, or can be of any other flexible material.

In the form shown, the tube 22 is sealed around the opening 20 by means of a collar 24 secured in air-tight fashion as by welding around the edge of the opening, a clamping ring 26 being placed around the lower end of the tube and fastening it securely to the collar.

The upper end of the tube 22 is similarly shown as secured by clamping ring 28 around a flange 30 which is part of a sound generator 32 conveniently secured as by a central rod 33 from the roof of the housing 10. The flange is part of a cylindrical air chamber 60 the upper end of which is closed by a vibratable diaphragm 62 held in place by a cover or cap 64. The lower end of chamber 60 is closed off by a rigid wall 66 through which is fitted a horn outlet pipe 68. A gas or air supply nipple 70 opens into the air chamber and is connected by flexible hose 35 to a source of actuating gas or air.

The sound generator can be made impervious to dust as by a dust-arresting closure across some convenient portion so that incoming dust does not build up in the generator and interfere with its operation. Where the generator is actuated by gas, no dust-arresting closure is generally needed inasmuch as the dust build-up will generally not interfere with its operation, and the closing of the supply line for the actuating gas effectively prevents dust penetration into the only path through which dust leakage can generally take place.

An exit conduit 34 equipped with a flow controlling damper 36 is connected to a convenient portion of the housing 10 above the partition 12 and provides an outlet line through which the filtered gas is removed from the clean air compartment.

The sound generator 32 can be of the type in which a vibrating diaphragm generates the sound, as in conventional horns, or the type in which a vibrating air column generates the sound, as in whistles, or of any type such as vibrating reed or vibrating disc types, and can be actuated by either gas or electro-magnets or the like. The generator should have a minimum output of 125 decibels with a frequency in the range of 200 to 4000 cycles per second depending upon the characteristics of the particular filter tube. The direct connection of a vibrating diaphragm type sound generator to the filter tube, particularly with the inner surface of the tube directly exposed to the sound emitted by the generator, makes an extremely effective combination. A frequency of 340 cycles per second, for example, will rapidly loosen dust from the inner surface of a filter wall 6 inches in diameter and 8 feet long at a sound energy level of 130 decibels. However, the dust cake tends to separate from the filter fabric in patches with a greater degree of removal near the generator. Accordingly, where the tubes are over 4 feet long, it is desirable to condition the filter cake so that less energy is required for removal and more uniform removal obtained. A single gentle twisting of the filter tube will perform this function. In the construction of FIG. 1 an air cylinder operated arm is installed for this purpose.

The sound generator supporting rod 33 which projects through the roof of the housing is free to turn in bushing 38. An arm 40 extends laterally from the upper end of rod 33 to which it may be connected by a collar 42. The arm 40 is in turn pivotally connected to the shaft 44 of an air cylinder 48 which is pivotally mounted at 50 to a suitable shelf 52 that can be formed at the top of the housing. Actuation of the air cylinder 48 moves the arm 40 radially to and fro around the axis of rod 33, and thereby causes the rod to correspondingly twist the filter tube 22.

In operation the apparatus of FIG. 1 can have a blower intake connected to conduit 34, and a source of dusty gas such as the drier or kiln exhausts of a cement plant, the carbon collectors in carbon black plants where the carbon is removed from the combustion products in which it is formed, and the exhaust of a smelter or metal refiner, connected to inlet 18. The blower is operated to suck the dusty gases through the filter tube until it becomes loaded with so much dust that its air capacity is reduced. The stream of dusty gas is then stopped as by closing damper 36, or diverted to a parallel-connected filter tube. The air cylinder 48 is then actuated causing rod 33 to rotate slowly 30 or 40° and stop. At this point the sound generator 32 is energized. Additional assistance can be provided to the sound generator 32, if necessary, by causing the rod 33 to oscillate slowly through the 30–40° arc several times while the sound generator 32 is energized. The oscillation is represented by the double-ended arrow 54, and can be at a rotational rate that causes the tube periphery to move at a linear speed of no more than about 5 inches per second. This rapidly loosens the dust within the filter tube and after less than a minute there will be enough loosening and dropping of the dust down into the dusty air compartment 16 that the tube 22 can be returned to the filtering circuit. In addition, the deposited dust can be cleaned out of the dusty air compartment 16 as by providing it with a bottom in the shape of a hopper equipped with a clean-out door 44. After the sound generator 32 is deenergized, the damper 36 is opened and filtration through tube 22 begun again.

The construction of FIG. 1 also has provision for using air pressure to assist the sound operation. The clean air outlet line 34 is branched upstream to damper 36, with an outlet 56 to the atmosphere. A second damper 58 controls the opening and closing of the outlet 56.

The unit of FIG. 1 can be connected in parallel with one or more other such units so that they all have their inlet conduits connected to a single source of dust-laden gas, and their outlets 34 to one or more suction sources.

The assembly of units can be operated with the individual filter units simultaneously filtering. When one of the filter units is ready for cleaning, its flow control damper 36 is first closed, interrupting the normal flow of gas through it. Damper 58 is then opened, and since the other unit or units are still in normal operation, the suction produced in supply line 18 by the action of the suction sources in the normally operating units causes a flow of gas through the interrupted unit in a reverse direction, from branch 56 to inlet 18. Sufficient time is allowed for the filter tube 22 to collapse, thus flexing and fracturing the filter cake built up on it. Damper 58 is then closed to relax the filter tube, and the sound generator energized. Additional assistance can be provided to the sound generator, if desired, as by slowly opening and closing the air bleeder damper 58 several times while the generator is energized, and FIG. 1 shows a repeating control 72 connected for this purpose. When the cleaning step is completed, the sound generator is deenergized and with damper 58 in the closed position, flow control damper 36 is opened so that the normal filtering action is reestablished. During the cleaning of one filter unit the other parallel connected unit or units continue with their filtering operation so that there is no interruption in the filter flow, although it might be diminished somewhat. By combining a suitable number of units, the cleaning intervals can be so synchronized that as soon as the cleaning of one unit is completed, the cleaning of another is started, so that there is no appreciable change in the total flow of gas.

The filtering assemblies can also have shut-off dampers or the like located in their inlet lines to close off the line leading to the part of the filter unit that is being cleaned, but such shut-offs are not essential.

The number of filter tubes in any one housing can range from 1 to several hundred, each mounted in parallel. Instead of twisting the bag pneumatically, any other means of causing fracture lines in the dust cake may be used, such as mechanical, hydraulic, or electrical means.

The sound generator can be used alone, that is without the assistance of the dust cake fracturing techniques. Where filter tubes are only about 6 inches apart, the cleaning effect of the individual sound generators extends with considerable effectiveness to the tubes around the one directly mounted on the generator, so that in a closely packed assembly some of the individual generators can be omitted.

The filter tube can also be arranged so that the dusty air is kept outside the filter tube and the clean air inside. This embodiment can have the sound generator located at the top or bottom of the filter tube.

Where fracture of the dust cake is obtained by reversal of the normal air flow through the filter tube, this reversal may be obtained by use of a separate blower or fan for this purpose instead of the air bleeder damper apparatus.

Although generally cylindrical tubes are illustrated above, the tubes can have non-circular cross-section, and may be elliptical, polygonal, etc.

A feature of the present invention is that by reason of the absence of the supports except at its ends, and the gentle nature of the flexing or twisting action the described combinations provide substantially no mechanical deterioration of the tube fabric. They are accordingly particularly useful for high temperature application where filter fabrics such as those made of glass cloth which are sensitive to mechanical deterioration, are necessary. As little as 5° of twist for each 2 feet of tube length provides all the dust loosening that is needed, and twisting by more than about 15° for every 2 feet of tube length has a tendency to unduly chafe the fibers of which the tube is made and thereby shorten its life, particularly where the tube is made of glass fiber cloth.

The flexing caused by reverse gas flow should be sufficient to cause the tube wall to move radially by a distance of at least ½ inch. The mounting of the tube should not stretch it so much that this flexing does not take place. In general no precautions as to minimum slack are needed. An operating pressure of only about ¼ inch of water across the wall of the filter tube is enough to provide the desired flexing.

The action of the sound waves in loosening the dust is in most cases modified by the particular dimensions of the tube as well as the nature of the material from which it is made. It is accordingly helpful to arrange for the sound generator to have a variable or adjustable frequency so that when the tube is placed in operation the frequency can be set to a value that gives the most effective results. It is also helpful to have sound simultaneously or consecutively generated at several different frequencies since this is more likely to assure the best operation and may even make it unnecessary to have the frequency adjusted.

FIG. 3 shows a modified sound generator construction.

This construction is generally similar to that shown in FIG. 1, but it has an adjustable horn 168 threaded into the floor 166 of air chamber 160. The threaded position of the horn in the floor is retained by means of lock nut 150.

Instead of a bell-shaped cap over diaphragm 62, the construction of FIG. 3 leaves the upper surface of the diaphragm substantially freely exposed. A ring 152 is bolted to the upper margin of chamber 160 as by means of bolts one of which is shown at 154, thus fixing the outer margin of the diaphragm in place. A narrow anchoring strap 156 is secured diametrically across the top of ring 152 and is also bolted to the chamber top as by bolts 158 that further assist in holding the diaphragm in place. A central opening in strap 170 can be arranged to receive the suspension rod 33, which can be welded in place in this strap, or secured in any other fashion.

The horn 168 in the construction of FIG. 3 can be adjusted so that its upper edges can have any desired spacing from the rest position of diaphragm 62. Spacings of from about .005 to .050 inch can be used and adjustment over this range will provide a selectable frequency at which the horn operates. In addition, the exposure of the top of the diaphragm 62 reduces the back pressures on it and accordingly provides somewhat greater efficiency. With an air chamber having an internal diameter of 5.875 inches and a height of 1.125 inches, air at a pressure of 30 pounds per square inch will give very effective sound generation at 300 to 400 cycles per second, when the diaphragm is a steel or brass disc 6 to 16 mils thick. A brass disc 10 mils thick has been found to make a particularly efficient sound generator in such use.

An entirely adequate cleaning of a glass fiber cloth filter tube 6 inches in diameter and 12 feet long can be completed with the above arrangement in about two minutes or even less, by the use of the sound alone. When combined with twisting or reverse air flow, the cleaning time can be reduced to about one minute, and with both the twist and the reverse flow, to about ½ minute.

Where oily vapors are present in the dust-laden gas, solid absorbents or filter aid materials can be introduced into the filter tubes, as by injection into the incoming gas stream after each cleaning. These materials absorb large quantities of oil particles without becoming gummy and without clogging or clumping up. Examples of these materials include ground stone, carbon black and diatomaceous earth. Filter aids can also be used to decontaminate or chemically deactivate gas streams as by reacting with fluorine or active fluorides that may be present and may otherwise attack the filter tube. Ground silica or ground limestone are effective for this purpose.

Obviously many other modifications and variations of the present invention are possible in the light of the above teachings. It is, therefore, to be understood that within the scope of the appended claims the invention may be practiced otherwise than as specifically described.

What is claimed is:

1. A dust filter having a housing through which dust-laden gases can be passed, a generally vertically directed filter tube supported within the housing and connected to cause the dust-laden gas to pass through the wall of the tube from one face thereof thereby trapping the dust carried by the gas on the wall while clean gas emerges from the other face of the wall, the filter wall of the tube being about 4 to 25 feet long, the upper end of the tube being directly secured around a sound-generator connected for intermittent energization to emit sound with an intensity that loosens the dust particles trapped on the filter wall and causes the loosened particles to drop off the tube.

2. The combination of claim 1 in which flexing structure is connected to flex the tube wall at about the time the sound generator is energized.

3. The combination of claim 1 in which a twisting means is connected to the upper end of the tube for twisting the tube when the sound generator is energized.

4. The combination of claim 1 in which the filter tube is made of glass fiber textile and is unsupported except at its ends.

5. The combination of claim 1 in which there is provided a flow-reversing mechanism connected to reverse the flow of gas through the filter wall at about the time when the sound generator is energized.

6. The combination of claim 5 in which the flow-reversing mechanism is connected to a repeating control for providing repeated pulses of reverse gas flow at about the time when the sound generator is energized.

7. A dust filter having a housing through which dust-laden gases can be passed, a generally vertically directed filter tube supported within the housing and having its lower end open to receive dust-laden gas, the tube having a filter wall construction and being connected to cause the received gas to leave the tube by passing through the wall while the dust carried by the gas is trapped by the wall, the filter wall of the tube being about 4 to 25 feet long, a sound generator is mounted in the housing and connected for intermittent energization to emit sound with an intensity that loosens the dust particles trapped on the filter wall and causes the loosened particles to drop off, and twisting means is connected to the top of the tube to twist the tube at about the time when the generator is energized to help loosen and drop the dust particles.

8. A dust filter having a housing through which dust-laden gases can be passed, a generally vertically directed filter tube supported within the housing and connected to receive the dust-laden gas at its lower end, the tube having a filter wall construction to cause the received gas to leave through the wall while the dust carried by the gas is trapped by the wall and thereby retained within the tube, the filter wall of the tube being about 4 to 25 feet long, the upper end of the tube being directly secured around a sound-generating horn connected for intermittent energization to emit sound with an intesity that looses the dust particles trapped on the inside of the filter wall and causes the loosened particles to drop through the tube and out its lower end.

9. The combination of claim 7 in which the twisting means is connected to twist the tube at a linear speed of no more than about 5 inches a second and with an amount of twist between about 5 and 15° of rotation for every 2 feet of tube length.

10. The combination of claim 8 in which the filter tube is made of glass fiber textile and is unsupported except at its ends, twisting means is connected to the upper end of the tube for twisting the tube when the sound generator is energized, a flow reversing mechanism is provided to reverse the flow of gas through the filter wall at about the time when the sound generator is energized, and the flow reversing mechanism includes a repeating control connected to supply repeated pulses of reverse gas flow.

References Cited in the file of this patent

UNITED STATES PATENTS

| | | |
|---|---|---|
| 2,014,298 | Schneible | Sept. 10, 1935 |
| 2,167,236 | Giesler | July 25, 1939 |
| 2,746,561 | Beber et al. | May 22, 1956 |
| 2,769,506 | Abboud | Nov. 6, 1956 |
| 2,781,104 | Fischer | Feb. 12, 1957 |
| 2,845,140 | Luhr | July 29, 1958 |
| 2,854,091 | Roberts et al. | Sept. 30, 1958 |
| 2,962,120 | Lagarias | Nov. 29, 1960 |